(12) United States Patent
Leung et al.

(10) Patent No.: US 8,900,706 B2
(45) Date of Patent: Dec. 2, 2014

(54) CELLULOSE NANOCRYSTALS FROM RENEWABLE BIOMASS

(75) Inventors: Chi Woon Leung, Westmount (CA); John H. T. Luong, Mount Royal (CA); Sabahudin Hrapovic, Laval (CA); Edmond Lam, Westmount (CA); Yali Liu, Pointe Claire (CA); Keith B. Male, Kirkland (CA); Khaled Mahmoud, St-Laurent (CA); Denis Rho, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 112 days.

(21) Appl. No.: 13/513,334

(22) PCT Filed: Mar. 15, 2010

(86) PCT No.: PCT/CA2010/000372
§ 371 (c)(1),
(2), (4) Date: Jun. 1, 2012

(87) PCT Pub. No.: WO2011/072365
PCT Pub. Date: Jun. 23, 2011

(65) Prior Publication Data
US 2012/0244357 A1    Sep. 27, 2012

Related U.S. Application Data

(60) Provisional application No. 61/282,094, filed on Dec. 15, 2009.

(51) Int. Cl.
*B32B 5/16*    (2006.01)
(52) U.S. Cl.
USPC ............... 428/402; 536/56; 536/84; 536/120; 536/124; 977/773
(58) Field of Classification Search
USPC ........ 536/56, 84, 120, 124; 428/402; 977/773
See application file for complete search history.

(56) References Cited

U.S. PATENT DOCUMENTS

| 5,004,523 | A | | 4/1991 | Springer et al. | |
|---|---|---|---|---|---|
| 5,405,953 | A | * | 4/1995 | Banker et al. | 536/56 |
| 2004/0241436 | A1 | | 12/2004 | Hsieh et al. | |
| 2005/0255239 | A1 | | 11/2005 | Zhu et al. | |
| 2006/0144543 | A1 | | 7/2006 | Aho et al. | |
| 2008/0108772 | A1 | | 5/2008 | Oksman et al. | |
| 2008/0146701 | A1 | | 6/2008 | Sain et al. | |

FOREIGN PATENT DOCUMENTS

WO    2009/069641 A1    6/2009

OTHER PUBLICATIONS

Bai W, Holbery J, Li K. (2009) Cellulose. 16, 455.
Bhatnagar A, Sain M. (2005) J. Reinf. Plast. Compos. 24, 1259.
Brown Jr. RM, Willison JHM, Richardson CL. (1976) Proc. Natl. Acad. Sci. U.S.A. 73, 4565.
Calvini P, Gorassini A, Luciano G, Franceschi E. (2006) Vib. Spectrosc. 40, 177.
Cao X, Dong H, Li CM. (2007) Biomacromolecules. 8, 899.
Cao X, Chen Y, Chang PR, Stumborg M, Huneault MA. (2008) J. Appl. Polym. Sci. 109, 3804.
Cheng KC, Catchmark JM, Demirci A. (2009) J. Biol. Eng. 3, 12.
da Silva Perez D, Montanari S, Vignon MR. (2003) Biomacromolecules. 4, 1417.
Dong XM, Revol J-F, Gray DG. (1998) Cellulose. 5,19.
Dong S, Roman M. (2007) J. Am. Chem. Soc. 129, 13810.
Edgar C, Gray DG. (2003) Cellulose. 10, 299.
Filson, PB et al. (2009) Sono-chemical preparation of cellulose nanocrystals from lignocellulose derived materials. Bioresource Technology. 100: 2259-2264.
Guhados G, Wan WK, Hutter JL. (2005) Langmuir. 21, 6642.
Hsu S-C, Don T-M, Chiu W-Y. (2002) Polym. Degrad. Stab. 75, 73.
Iguchi M, Yamanaka S, Budhiono A. (2000) J. Mater. Sci. 35, 261.
Ioelovich M. (2008) Bioresources. 3, 1403.
IPRP on CA/2010/000372 Apr. 3, 2012.
ISR/WO on CA/2010/000372 Apr. 3, 2012.
Kramer K, Ebel S. (2000) Anal. Chim. Acta. 420, 155.
Kumar V, Kothari SH. (1999) Int. J. Pharm. 177, 173.
Leung, ACW et al. (2011) Characteristics and Properties of Carboxylated Cellulose Nanocrystals Prepared from a Novel One-Step Procedure. small, 7, No. 3, 302-305.
Mahmoud KA, Male KB, Hrapovic S, Luong JHT. (2009) Appl. Mat. Interfaces. 1, 1383.
Montanari S, et al. (2005) Topochemistry of Carboxylated Cellulose Nanocrystals Resulting from TEMPO-Mediated Oxidation. Macromolecules. 38, 1665-1671.
Nelson ML, O'Connor RT. (1964) J. Appl. Polym. Sci. 8, 311.
Nishiyama Y, Langan P, Chanzy H. (2002) J. Am. Chem. Soc. 124, 9074.
Ohad I, Danon IO, Hestrin S. (1962) J. Cell. Biol. 12, 31.
Poke FS, Raymond CA. (2006) J. Wood Chem. Technol. 26, 187.
Revol J-F, Bradford H, Giasson J. Marchessault RH, Gray DG. (1992) Int. J. Biol. Macromol. 14, 170.
Segal L, Creely JJ, Martin AE, Conrad CM. (1959) Textile Res. J. 29, 786.
Stiernstedt J, Nordgren N, Wagberg L, Brumer H, Gray DG, Rutland MW. (2006) J. Colloid Interface Sci. 303, 117.

(Continued)

*Primary Examiner* — Leszek Kiliman
(74) *Attorney, Agent, or Firm* — Laura Catherine Eckenswiller (57) ABSTRACT

A process for producing cellulose nanocrystals (CNCs) involves providing a cellulosic material, contacting the cellulosic material with an inorganic persulfate at an elevated temperature to produce CNCs, and recovering the CNCs. The process permits one-step production of CNCs from vegetative biomasses such as flax and hemp. Cellulose nanocrystals produced by the process with carboxylic groups are more uniform and have higher aspect ratios than CNCs produced by prior art processes.

5 Claims, 3 Drawing Sheets

(56) References Cited

OTHER PUBLICATIONS

Šturcová A, Davies GR, Eichhorn SJ. (2005) Biomacromolecules. 6, 1055.
Thygesen A, Oddershede J, Lilholt H, Thomsen AB, Stahl K. (2005) Cellulose. 12, 563.
Wang B, Sain M, Oksman K. (2007) Appl. Compos. Mater. 13, 89.
Montanari, S. et al, Topochemistry of Carboxylated Cellulose Nanocrystals Resulting from TEMPO-Mediated Oxidation, Macromolecules 2005, 38, 1665-1671.
Extended European Search Report, 10836868.9, Sep. 4, 2013.

* cited by examiner

| Flax (NCC) | Flax | Avicel MCC (NCC) | Avicel MCC | Hemp (NCC) | Hemp | Whatman (NCC) | Whatman | Shives (NCC) | Shives | Bacteria (NCC) | Bacterial | Assignment | Cellulose Type |
|---|---|---|---|---|---|---|---|---|---|---|---|---|---|
| 3356 | 3383 | 3356 | 3346 | 3384 | 3386 | 3346 | 3345 | 3407 | 3382 | 3443 | 3349 | O(3)H...O(5) Intramolecular | Cellulose-I-alpha |
|  |  |  |  |  |  |  |  |  |  |  | 3241 | O(6)H...O(3) Intramolecular |  |
| 2901 | 2917 | 2900 | 2900 | 2901 | 2918 | 2900 | 2901 | 2902 | 2918 | 2923 | 2924 | Symmetric CH2 Valance Vibration |  |
| 1735 | 1728 | 1729 |  | 1730 | 1737 | 1731 |  | 1736 | 1738 | 1725 |  | C=O Vibration of COOH |  |
| 1641 | 1644 | 1641 | 1641 | 1641 | 1640 | 1641 | 1642 | 1640 | 1638 | 1658 | 1633 | Water |  |
|  |  | 1566 |  | 1564 |  |  |  |  |  | 1537 |  | Carboxylate Antisymmetric Vibration |  |
|  | 1513 | 1549 |  | 1548 | 1510 |  |  | 1510 | 1510 |  |  | Carboxylate Antisymmetric Vibration |  |
|  |  |  |  |  |  |  |  |  | 1463 | 1465 |  | Aromatic Skeletal Vibrations |  |
| 1430 | 1429 | 1430 | 1430 | 1431 | 1427 | 1432 | 1431 | 1427 | 1426 | 1418 | 1433 | CH2 Bending | Cellulose-I |
|  |  |  |  | 1402 |  |  |  | 1401 |  |  |  |  |  |
| 1373 | 1372 | 1373 | 1372 | 1373 | 1375 | 1373 | 1373 |  | 1376 | 1376 | 1374 | CH Bending |  |
| 1337 | 1336 | 1336 | 1337 | 1336 |  | 1338 | 1338 |  |  |  | 1337 | OH In Plane Bending |  |
| 1318 | 1318 | 1318 | 1318 | 1319 | 1321 | 1318 | 1318 | 1319 | 1321 | 1315 | 1317 | CH2 Wagging |  |
|  | 1282 | 1282 | 1282 | 1281 |  | 1282 | 1282 |  |  |  | 1281 | CH Bending |  |
|  | 1237 | 1236 | 1236 | 1223 | 1248 | 1236 | 1236 |  | 1259 | 1262 | 1236 | OH Plane Deformation |  |
|  |  |  |  |  |  |  |  |  |  | 1229 | 1205 | C-C plus C-O plus C=O Stretch |  |
|  |  |  |  |  |  |  |  |  |  | 1200 |  | OH In Plane Bending |  |
| 1164 | 1159 | 1164 | 1164 | 1164 | 1160 | 1165 | 1164 | 1164 | 1161 | 1160 | 1163 | Antisymmetrical Bridge C-O-C Stretching | Cellulose-I |
| 1112 | 1112 | 1113 | 1113 | 1113 | 1109 | 1113 | 1114 | 1111 | 1108 | 1112 | 1111 | Antisymmetrical In Phase Ring Stretching | Cellulose-I |
| 1059 | 1060 | 1059 | 1060 | 1059 | 1058 | 1059 | 1059 | 1058 | 1051 | 1060 |  | C-O Stretching |  |
|  |  | 1032 |  | 1032 |  | 1032 | 1032 |  |  |  |  | C-O Stretching |  |
|  |  |  |  |  |  |  |  |  |  | 999 | 1012 | C-O Stretching |  |
| 897 | 898 | 898 | 898 | 894 | 898 | 896 | 900 | 894 | 898 | 896 | 898 | Antisymmetrical Out of Phase Stretching | Cellulose-I |
|  |  |  |  |  |  |  |  | 864 |  |  |  |  |  |
|  |  |  |  |  | 814 |  |  |  | 813 | 806 |  |  |  |
|  |  |  |  |  |  |  |  |  |  |  | 753 | CH2 Rocking | Cellulose-I-alpha |
|  |  |  |  |  |  | 708 | 708 |  |  | 720 | 712 | CH2 Rocking | Cellulose-I-beta |
| 665 | 670 | 666 | 671 | 670 | 671 | 665 | 666 | 663 | 665 | 671 | 669 | COH Out of Plane Bending |  |
|  | 616 | 616 | 617 | 617 | 616 | 616 | 616 |  | 610 | 611 | 615 | C-C-O Vibrations |  |

Fig. 4

CELLULOSE NANOCRYSTALS FROM RENEWABLE BIOMASS

CROSS-REFERENCE TO RELATED APPLICATIONS

This application is a national phase entry of International Patent Application PCT/CA2010/000372 filed Mar. 15, 2010 and claims the benefit of United States Provisional Patent Application Serial No. U.S. Ser. No. 61/282,094 filed Dec. 15, 2009, the entire contents of both of which are herein incorporated by reference.

FIELD OF THE INVENTION

The present invention relates to a process for producing cellulose nanocrystals from renewable biomass, and to cellulose nanocrystals with carboxylic groups produced by the process.

BACKGROUND OF THE INVENTION

Described in 1838 by French scientist Anselme Payen, cellulose has the molecular formula $(C_6H_{10}O_5)_n$. It is the most abundant organic polymer, being used in an amount of about $1.5 \times 10^{12}$ tons per year. It has been used as a renewable, biodegradable and environmentally benign chemical raw material for 150 years. Cellulose is semicrystalline, having both crystalline and amorphous regions. It is densely packed with strong inter- and intramolecular hydrogen bonds conferring excellent mechanical properties.

Cellulose nanocrystals (CNCs) have emerged as a new class of nanomaterials for polymer reinforcement and nanocomposite formulation owing to their exceptionally high mechanical strength (modulus of 145 GPa; Marks, 1967), tensile strength of 7.5 GPa (Šturcová, 2005), chemical tunability, and anticipated low cost. CNCs have also been fostered for diversified applications including enzyme immobilization (Mahmoud et al., 2009), drug delivery, and biomedical applications (Dong and Roman, 2007).

In order to produce CNCs, fiber sources from various vegetative wastes with high initial cellulose contents are being considered as potential starting materials due to their low costs. The amorphous regions of the cellulose fibers must be chemically removed to yield highly crystalline CNCs. Popular acid hydrolysis using a single concentrated acid or an acid mixture, often with the aid of an oxidant, is capable of dissolving the amorphous regions (Revol et al., 1992), leaving behind CNCs with crystalline rod-like fibers. Such procedures, however, are expensive, requiring considerably high initial capital investment and having high operating costs due to the corrosiveness, safety issues and hazardous waste treatment/disposal requirements of such acids and their by-products. Additional pre- and/or post-treatment steps with alkaline or bleaching reagents are required to remove non-cellulosic fiber contents (e.g. lignin, pectin, hemicelluloses, etc).

Bai et al. (2009) describe a method for the production of CNCs with narrow distribution from microcrystalline cellulose (MCC). A conventional sulfuric acid procedure was used to produce CNCs (Dong et al., 1998). This process is known to produce a wide range of size distribution. In order to obtain a narrow size distribution of CNCs, differential centrifugation with at least six cycles was required. Even so, the CNCs still exhibited at least four different aspect ratios.

US 2008/0108772 (Oksman et al., 2008) describes a process for producing cellulose nano whiskers by treating MCC with HCl, as well as a new extrusion method to produce a reinforced organic polymeric material. The production of cellulose nano whiskers using HCl hydrolysis required pure cellulosic materials (e.g. MCC) and the resulting cellulose nano whiskers had a large size distribution. Fractions of cellulose crystals with larger size were isolated by centrifugation at low speed and discarded. The cellulose nano whiskers produced had a large size distribution of 100 nm to 1000 nm in length and 5 nm to 15 nm in width.

Persulfates, for example ammonium persulfate, are well known strong oxidants. In the prior art, for example as described in U.S. Pat. No. 5,004,523 (Springer and Minor, 1991), ammonium persulfate has been used for the isolation of lignin from lignocellulosic materials. Usually a mixture of ammonium persulfate together with either strong acid (50% HCl or $H_2SO_4$) or strong base (KOH or NaOH) is required. The product isolated from this process is bleached cellulose, not CNCs.

There remains a need for a simple, cost-effective process for producing CNCs, especially from vegetative biomass.

SUMMARY OF THE INVENTION

It has now been surprisingly found that an inorganic persulfate is able to produce clean cellulose nanocrystals (CNCs) from vegetative biomass in one step by dissolving lignin, hemicellulose, pectin, and other plant contents.

In one aspect of the present invention, there is provided a process for producing cellulose nanocrystals comprising: providing a cellulosic material; contacting the cellulosic material with an inorganic persulfate at an elevated temperature to produce cellulose nanocrystals; and, recovering the cellulose nanocrystals.

The inorganic persulfate preferably comprises ammonium persulfate $((NH_4)_2S_2O_8)$, sodium persulfate $(Na_2S_2O_8)$, potassium persulfate $(K_2S_2O_8)$ or a mixture thereof. More preferably, the inorganic persulfate comprises ammonium persulfate, $(NH_4)_2S_2O_8$.

Any suitable source of cellulosic materials may be used, for example, vegetative or non-vegetative biomasses. Non-vegetative biomasses include cellulosic materials that have undergone considerable pre-treatments, for example, cellulose from papers and microcrystalline cellulose (MCC). It is an advantage of the present process that CNCs may be produced in one step from vegetative biomass. Thus, the cellulosic material preferably comprises vegetative biomass, more preferably raw vegetative biomass. Any suitable vegetative biomass may be used, for example, one or more of hemp material (e.g. raw hemp, pectate-lyase treated hemp), flax material (e.g. raw flax, pectate-lyase treated flax), triticale material, wood sources (e.g. wood pulp, cardboard) and agricultural residues. More preferably, the cellulosic material comprises one or more of hemp or flax material.

The process is conducted at an elevated temperature. Preferably, the elevated temperature is in a range of from about 45° C. to about 80° C., for example about 60° C. The persulfate is preferably provided in an aqueous solution. The aqueous solution preferably has a concentration of persulfate in a range of from about 0.5 M to about 2.0 M, more preferably in a range of from about 0.5 M to about 1.0 M, for example about 1.0 M. Preferably, the persulfate is stirred with the cellulosic material. Preferably, contacting the cellulosic material with persulfate is performed for a period of time in a range of from about 5 hours to about 24 hours, for example about 16 hours.

In another aspect of the present invention, there is provided a cellulose-based material comprising nanocrystals of cellulose, the nanocrystals having surface carboxylic acid groups.

In another aspect of the present invention, there is provided a cellulose-based material comprising nanocrystals of cellulose, the nanocrystals having an average diameter of less than about 7 nm with substantially all of the nanocrystals having diameters within about 0.5 nm of the average diameter and an aspect ratio (L/D) of 10 or greater.

The average diameter is preferably less than about 5 nm. In one embodiment, the average diameter is in a range of from about 3 nm to about 7 nm, preferably in a range of from about 3 nm to about 4.9 nm. The aspect ratio is preferably in a range of from about 12 to about 60. Preferably, substantially all of the nanocrystals have diameters within about 0.3 nm of the average diameter. CNCs of the present invention preferably have a crystallinity index (CRI) that is 5% or more greater than the CRI of the cellulosic material from which the CNCs are made. Advantageously, the CRI may be 7% or more greater than, or even 10% or more greater than, the CRI of the cellulosic material from which the CNCs are made. The CRI may be, for example, up to 20% greater, or up to 17% greater, than the CRI of the cellulosic material from which the CNCs are made. The values of 5% or more, 7% or more or 10% or more may be lower limits of a range in which the upper limit is 20% or 17%. Preferably, the surface carboxylic acid groups are formed by selective oxidation of C6 primary hydroxyl groups of the CNCs. Preferably, the degree of oxidation is in a range of from about 0.01 to about 0.20, more preferably in a range of from about 0.08 to about 0.19, or in a range of from about 0.05 to about 0.10, for example about 0.08.

The present process is advantageously a one-step process for producing CNCs from vegetative biomass that has significant benefits in terms of scalability, safety, sustainability and low-cost. The present approach may be considered as a chemical nanoscissor and is effective in processing raw cellulosics, especially flax and hemp, which contain hemicellulose, lignin and pectin; in contrast to prior art acid hydrolysis processes which require pre-purification (e.g. steam exploding) and post-purification (e.g. bleaching) steps to produce good quality CNCs. For example, the present process is useful for processing high-lignin cellulosic materials (e.g. 20% or more lignins), which obviates the need for steam exploding the cellulosic material while still resulting in good quality CNCs. The stability and economic viability of persulfate renders it a suitable replacement for acids as strong oxidants.

The present facile process provides a commercially viable method of obtaining CNCs with enhanced uniformity and crystallinity and with smaller diameter and larger aspect ratio than conventional processes. The present process directly results in uniform CNCs with a narrow size distribution, as opposed to conventional processes as disclosed in Dong et al., 1998, Bai et al., 2009 or Oksman et al., 2008 for example, which require tedious post-separation techniques to improve uniformity and which still do not result in uniformity as good as in the present invention. Thus, the present process produces high yields of CNCs with narrow size distribution without requiring tedious separation steps such as differential centrifugation. Further, CNCs produced in the present process are surface carboxylated with 8% or higher functionality, which makes them more reactive and improves their flexibility and processability in composites. In contrast, acid hydrolysis produces CNCs having only hydroxyl groups (when HCl is used) or having only up to 2% sulfonyl groups (when $H_2SO_4$ is used).

CNCs have a wide range of applications, including use as nanofillers in the polymer industry and use as high strength nanopaper in personal body armor.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Materials:

Ammonium persulfate, potassium persulfate, and sodium persulfate were obtained from Aldrich (St. Louis, Mo., USA). Avicel PH102 microcrystalline cellulose was obtained from FMC Corp (Philadelphia, Pa., USA). Whatman CFI cellulose powder was purchased from Whatman Inc. (Piscataway, N.J., USA). Flax (*Linum usitatissimum*) and flax shives from Saskatchewan, Canada and hemp (*Cannabis sativa*) from Quebec, Canada. Triticale straw extract was obtained from Dr. G. (Joe) Mazza, Agriculture and Agri-Food Canada, Summerland, BC, Canada. This freeze dried extract comprises 54.5% cellulose, 12% hemicelluloses and 20% lignin. Bacterial cellulose was obtained from Dr. W. K. Wan, University of Western Ontario, London, ON, Canada. This bacterial cellulose is produced by the gram-negative bacteria *Acetobacter xylinum* BPR2001. The bacterial cellulose is produced in the form of fibers of diameter less than 50 nm and a degree of polymerization of between 2000 and 6000. Detailed information about the production, purification, and characteristics of the bacterial cellulose are known in the art.

Example 1

Preparation of Cellulose Nanocrystals (CNCs) by Persulfate

The process described in this example is an environmentally friendly, one-step procedure for the preparation of CNCs from different cellulosics. Ammonium persulfate has a very high solubility in cold water (85 g/100 mL), while the sodium (55.6 g/100 mL) and potassium (5.3 g/100 mL) counterparts (Weast, 1983) have lower solubility. CNCs were prepared by simply heating cellulosic materials at 60° C. in 1 M persulfate for 16 h with vigorous stirring, as described in more detail below using ammonium persulfate as an example. Lignocellulosic fibers such as flax and hemp were cut into short fragments (about 2-3 mm) prior to the persulfate treatment. Prolonged reaction time and persulfate concentrations above 1 M led to excessive hydrolysis, thereby reducing the yield of CNCs.

Thus, in one example, starting biomass material (0.1 g) was added to 10 mL of 1 M ammonium persulfate solution (conductivity about 230 mS·cm$^{-1}$). The suspension was heated to 60° C. for 16 h (only 3 h for bacterial cellulose) to give a white suspension of CNCs. The suspension was centrifuged (18,000 rpm, RCF=25,400) for 10 min. The solution was decanted, and about 50 mL of water was added to the CNC pellet, followed by 5 min of vigorous mixing and repeated centrifugation. The centrifugation/washing cycles were repeated 4 times until the conductivity of the solution was about 5 μS·cm$^{-1}$ (pH about 6), close to the conductivity of deionized water. The product was lyophilized to yield a white solid.

Example 2

Atomic Force Microscopy (AFM) and Transmission Electron Microscopy (TEM)

CNCs prepared using ammonium persulfate were sonicated and atomic force microscopy (AFM) micrographs of such resulting CNCs were obtained using a Nanoscope™ IV (Digital Instruments, Veeco, Santa Barbara, Calif.) with a silicon tip operated in tapping mode. Particle analysis of the AFM micrographs was performed using Scion™ Image (http://www.scioncorp.com/pages/scion_image_windows.htm).

TEM micrographs were obtained by a Hitachi transmission electron microscope (TEM) at 60 kV (model H-7500, Tokyo, Japan). TEMs were obtained as follows. A small amount of CNCs was suspended in methanol and sonicated to disperse the material. A 20 μL drop of well dispersed suspension was then dried on a Formvar-carbon coated grid and analyzed. Low Voltage Transmission Electron Microscopy (LVTEM) micrographs were obtained by a Delong LVEM (Soquelec Ltd., Montreal, QC, Canada) low-voltage TEM at 5 kV, with lower accelerating voltages generating higher contrast between the carbon mesh and CNCs.

Figure 1A:
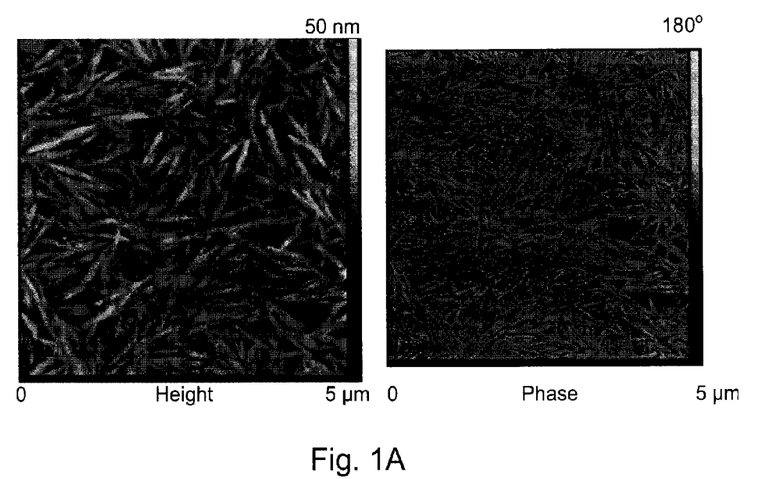
FIG. 1A depicts height and phase mode AFM micrographs of CNCs from flax produced using ammonium persulfate in accordance with the present invention (5 µm)
Figure 1B:
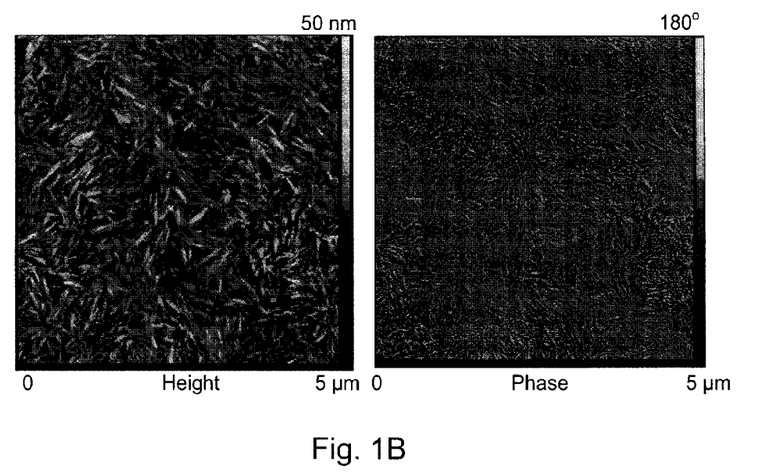
FIG. 1B depicts height and phase mode AFM micrographs of CNCs from hemp produced using ammonium persulfate in accordance with the present invention (5 µm)

AFM (FIG. 1A and FIG. 1B) and TEM micrographs confirmed the rod-shape geometry of the CNCs. Such rod-shapes were highly uniform compared to those obtained by prior art acid treatment. For flax (FIG. 1A), the diameter of the CNCs was 3.8±0.1 nm while the length was 144±5 nm. For comparison, prior art acid hydrolysis of flax gave CNCs with a diameter of 21±7 nm and a length of 327±108 nm (Cao et al., 2007). For hemp (FIG. 1B), the diameter of CNCs was 5.8±0.1 nm, while the length was 148±3 nm. For comparison, prior art acid hydrolysis of hemp gave CNCs with a diameter of 30±10 nm and a length that was micrometers in size (Cao et al., 2008).

Nanocrystal size, shape, and size distribution were dependent to a certain extent upon the starting cellulosic material. As an example, the cross-section dimension of CNCs prepared from hemp and flax centered on about 2-6 nm, reflecting elementary fibrils (about 3-7 nm in diameter) initially present in the starting materials. Such CNCs are much more uniform and significantly smaller than CNCs obtained by prior art acid hydrolysis (diameters ranging from 10-20 nm; Mahmoud et al., 2009).

Tables 1 and 2 provide yield, crystallinity index (CRI) and dimensions of CNCs prepared from various sources using ammonium persulfate. CRIs are estimated using the integral method and from peak heights (in parentheses). Length and diameter are reported at 95% confidence interval.

TABLE 1

| Cellulose type | Yield (%) | CRI (%) Literature values | CRI (%) Before treatment | CRI (%) After treatment |
|---|---|---|---|---|
| Flax | 28 | 50-70 (Loelovich, 2008) | 69 (76) | 75 (80) |
| Flax shives | 22 | — | 48 (50) | 64 (51) |
| Hemp | 36 | 50-60 (Wang, 2007) | 56 (55) | 73 (76) |
| MCC | 84 | 65-75 (Kumar, 1999) | 79 (81) | 83 (84) |
| Whatman CF1 | 81 | 88 (Calvini, 2006) | 91 (92) | 91 (92) |
| Bacterial cellulose | 14 | 60-80 (Cheng, 2009) | 59 (61) | 70 (74) |
| Cardboard | 67 | — | 67 (73) | 76 (82) |
| Triticale (20% lignin) | 31 | — | 61 (65) | 73 (77) |
| Wood pulp | 36 | — | 73 (75) | 81 (82) |

TABLE 2

| Cellulose type | Length (std. deviation (SD), nm) | Diameter (std. deviation (SD), nm) |
|---|---|---|
| Flax | 144 ± 5 (n = 138, SD = 53) | 3.8 ± 0.1 (n = 1653, SD = 1.9) |
| Flax shives | 296 ± 16 (n = 445, SD = 194) | 5.1 ± 0.1 (n = 1350, SD = 1.7) |
| Hemp | 148 ± 3 (n = 292, SD = 52) | 5.8 ± 0.1 (n = 906, SD = 1.8) |
| MCC | 128 ± 4 (n = 100, SD = 38) | 5.5 ± 0.1 (n = 2291, SD = 1.5) |
| Whatman CF1 | 121 ± 3 (n = 129, SD = 39) | 6.7 ± 0.3 (n = 207, SD = 2.2) |
| Bacterial cellulose | 88 ± 5 (n = 500, SD = 55) | 6.5 ± 0.2 (n = 497, SD = 2.3) |
| Cardboard | 185 ± 6 (n = 56, SD = 47) | 7.0 ± 0.1 (n = 165, SD = 0.8) |
| Triticale (20% lignin) | 134 ± 5 (n = 118, SD = 54) | 4.2 ± 0.1 (n = 266, SD = 1.8) |
| Wood pulp | 124 ± 6 (n = 200, SD = 41) | 6.0 ± 0.2 (n = 253, SD = 1.7) |

Other CNC samples prepared from different cellulosics also showed a similar mean particle length and length polydispersity. In comparison, CNCs produced from flax and hemp using prior art acid hydrolysis procedures have higher average diameters of 16-28 nm and 20-40 nm, respectively. Further, the average length of CNCs prepared in accordance with the present invention was about 90-150 nm such that the average aspect ratio of the CNCs was determined to be 30 compared to 10 for CNCs obtained by acid hydrolysis. These are very important findings since the uniformity, small size, and high aspect ratio of cellulose nanocrystals are critical for their intended applications as nanofillers. Considering the dimension of one unit cell (7.8 Å, 8.2 Å, and 10.4 Å), or one glucose unit of the cellulose chain is equal to about 0.5 nm, the degree of polymerization of CNCs was estimated to be 20 to 500 using a known method in the art (Nishiyama et al., 2002).

Example 3

Scanning Electron Microscopy (SEM)

SEM analysis was performed on a Hitachi S 2600N scanning electron microscope at 2.8 kV. SEM revealed morphological changes on the surface of the fibers upon ammonium persulfate treatment, indicating the destruction of the amorphous regions. In contrast, the fiber remained intact when subjected to heating without ammonium persulfate. Ammonium persulfate was able to in situ produce clean CNCs by dissolving lignin, hemicellulose, pectin, and other plant contents. Free radicals are formed when the solution containing persulfate is heated ($S_2O_8^{2-}$+heat→$2SO_4^-$) (Hsu et al., 2002). Therefore, persulfates are often used as initiators for emulsion polymerization reactions in the preparation of polymers and synthetic rubber. In addition, under the acidic condition used in this study (pH 1.0), hydrogen peroxide was formed ($S_2O_8^{2-}$+$2H_2O$→$HSO_4^-$+$H_2O_2$) (Edgar and Gray, 2003; Stiernstedt et al., 2006). Collectively, such free radicals and $H_2O_2$ should be capable of penetrating the amorphous regions to break down the β-1,4 linkage of the cellulose chain to form CNCs. Both free radicals $2SO_4^-$ and $H_2O_2$ also opened the aromatic rings of lignin to decolorize this material. Prior art acid hydrolysis procedures require alkaline or bleaching agents to remove the other fiber contents and this treatment often affects the crystallinity and structure of cellulose (conversion of cellulose I to cellulose 11; Krassig, 1996).

Example 4

X-Ray Diffraction (XRD) Analysis

Wide angle X-ray scattering analyses were obtained at room temperature on a Panalytical X'pert PrO diffractometer equipped with a copper (CuKα, λ=1.54184 Å) rotating anode source, along with instrumental settings of 45 kV and 40 mA. Samples were carefully deposited on glass slides and inserted in the chamber. The collected data were analyzed using WinPLOTR (hllp:llwww.llb.cea.fr/fullweb/winplotrlwinplotr.htm), a graphic tool for powder diffraction to provide peak position (2θ), FWHM (full width half maximum), peak deconvolution, and integration intensity for calculation of the crystallinity index (CRI). The $d_{hkl}$-spacing is calculated as λ/2 sin θ with λ=1.54184 Å. The crystal size is estimated as Kλ/FWHM.cos θ with the form factor or Scherrer constant (K) taken as 1 (Scherrer, 1918).

Figure 2:
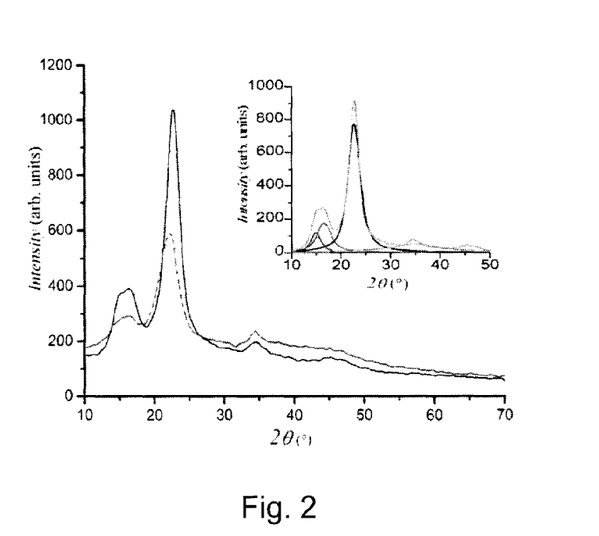
FIG. 2 depicts PXRD spectra of CNCs produced from hemp before and after treatment with 1 M ammonium persulfate in accordance with the present invention, with the inset showing deconvoluted cellulose peaks.

CNCs prepared from various biomass sources were characterized by X-ray diffraction (XRD). Results are provided in FIG. 2 and in Tables 3 and 4. FIG. 2 shows PXRD spectra of CNCs produced from hemp before and after treatment with 1 M ammonium persulfate. The inset shows the deconvoluted cellulose peaks. Table 3 provides a comparison of crystallite size, $d_{hkl}$-spacing and crystallinity index (CRI) before and after treatment of biomass samples. Table 4 provides a comparison of the peak position (2θ) values for the most intense peaks before and after treatment of biomass.

The CNC diffractograms exhibited the most intense peak (002) with a shoulder (021) and two lower peaks (101 and 10-1). In some samples, a very small peak (040) at 35° was observed. In all cases, the (002) peak position remained virtually unchanged during the course of treatment. Such features, including the d-spacing and average crystallite size as determined by the Debye-Scherrer formula (Debye, 1915) resembled the diffraction pattern of cellulose I and confirmed the integrity of the material during the course of treatment with ammonium persulfate. The crystallinity index (CRI) of CNCs was then estimated using an integral method based on the ratio of the areas of crystallines to total scattered intensity (Jayme and Knolle, 1964) with the results summarized in Table 1. CRI estimated using the maximum intensity (peak height) from (002) plane and the intensity of the background scatter measured at 2θ of about 18° often results in overestimated crystallinity (Segal et al., 1959; Thygesen et al., 2005). CNCs prepared in this work can be used to cast smooth thin films, which are suitable for surface force and friction measurements (Stienstedt et al., 2006).

In general, CRIs of CNCs were noticeably higher than that of their parental counterparts except for CNCs prepared from MCC and Whatman CFI. FWHM (full width half maximum) of the 002 peak was also smaller than that of the starting material, indicative of less dissolution of CNCs. For flax shives and hemp, the initial CRI was about 50-70%, in agreement with the literature data (Bhatnagar and Sain, 2005). With very high initial crystallinity, the treatment of MCC and Whatman CFI with ammonium persulfate just resulted in shorter fibers whereas the CRI remained unchanged.

TABLE 3

| | Before treatment | | | After treatment | | |
|---|---|---|---|---|---|---|
| | size (mm) | $d_{hkl}$-spacing (nm) | CRI (%) | size (mm) | $d_{hkl}$-spacing (nm) | CRI (%) |
| Hemp | 1.7564 | 0.5632 | 56.4 | 4.5868 | 0.5906 | 73.1 |
| | — | — | | 6.3320 | 0.5308 | |
| | 2.6249 | 0.4034 | | 3.8806 | 0.3920 | |
| Flax | 4.1825 | 0.6050 | 69.0 | 4.5967 | 0.5918 | 74.6 |
| | 3.2567 | 0.5341 | | 5.6655 | 0.5267 | |
| | 4.2455 | 0.3935 | | 5.1283 | 0.3898 | |
| Flax shive | 1.5867 | 0.5588 | 48.0 | 4.6685 | 0.5920 | 64.2 |
| | — | — | | 5.6237 | 0.5270 | |
| | 2.4553 | 0.4032 | | 2.4916 | 0.3938 | |
| Whatman (CFI) | 5.4105 | 0.5977 | 87.0 | 5.9028 | 0.5990 | 86.8 |
| | 6.8084 | 0.5382 | | 6.0317 | 0.5292 | |
| | 7.1689 | 0.3925 | | 6.9341 | 0.3921 | |
| MCC (Avicel PH-102NF) | 4.2244 | 0.5994 | 82.5 | 5.0081 | 0.6022 | 82.7 |
| | 5.2712 | 0.5379 | | 4.2969 | 0.5448 | |
| | 5.0042 | 0.3941 | | 4.9748 | 0.3951 | |
| Bacterial cellulose | 3.2418 | 0.6104 | 59.2 | 4.1081 | 2.6399 | 70.1 |
| | 4.5469 | 0.5264 | | 4.7465 | 1.4709 | |
| | 5.3526 | 0.3951 | | 4.5478 | 0.3930 | |

TABLE 4

| | Before treatment | | | | After treatment | | | |
|---|---|---|---|---|---|---|---|---|
| | (101) | (10-1) | (002) | (040) | (101) | (10-1) | (002) | (040) |
| Hemp | 14.79 | 16.45 | 22.05 | 34.30 | 15.03 | 16.55 | 22.63 | 34.38 |
| Flax | 14.77 | 16.52 | 22.63 | 34.29 | 14.97 | 16.79 | 22.80 | 34.39 |
| Flax shive | — | 15.66 | 21.89 | 34.49 | — | 16.12 | 22.46 | 34.19 |
| Whatman (CFI) | 14.68 | 16.40 | 22.64 | 34.15 | 14.74 | 16.48 | 22.73 | 34.22 |
| MCC (Avicel PH-102NF) | 14.82 | 16.34 | 22.52 | 34.57 | 14.84 | 16.39 | 22.59 | 34.02 |
| Bacterial cellulose | 14.72 | 16.83 | 22.49 | — | 14.84 | 16.79 | 22.61 | — |

Example 5

Preparation of CNCs by Sodium Persulfate and Potassium Persulfate

Sodium and potassium persulfate were also capable of producing CNCs. Similarly to ammonium persulfate treatment, CRIs of the CNCs produced with sodium and potassium persulfate increased by about 8-16% from their starting materials. The dimensions of the CNCs obtained from sodium and potassium persulfate are summarized in Table 5. CRIs are estimated using the integral method and from peak heights (in parentheses). Length and diameter are reported at 95% confidence interval.

TABLE 5

| Cellulose Type | Treatment | Yield (%) | CRI (%) after treatment | Length (SD, nm) | Diameter (SD, nm) |
|---|---|---|---|---|---|
| Flax | $Na_2S_2O_8$ | 14 | 77 (84) | 159 ± 4 (62, n = 196) | 5.3 ± 0.2 (1.7, n = 253) |
| Hemp | $Na_2S_2O_8$ | 14 | 77 (83) | 154 ± 5 (56, n = 148) | 4.7 ± 0.2 (1.5, n = 216) |
| Flax | $K_2S_2O_8$ | 15 | 76 (82) | 139 ± 5 (55, n = 118) | 5.0 ± 0.2 (1.9, n = 189) |
| Hemp | $K_2S_2O_8$ | 13 | 72 (78) | 123 ± 5 (48, n = 91) | 5.2 ± 0.2 (1.8, n = 305) |

Example 6

X-Ray Photoelectron Spectroscopy (XPS)

XPS analysis was performed using an AXIS™ ULTRA spectrometer (Kratos Analytical Ltd., Manchester, UK) equipped with a monochromatic Al Kα source at a power of 225 W. The elemental composition of the analyzed surface areas was obtained from survey spectra collected at pass energy of 160 eV. High-resolution C (1s) and O (1s) spectra were collected at 20 eV. The pressure in the analytical chamber was lower than $10^{-6}$ Pa and the apparatus was calibrated against the following lines: Au (4f), Ag (3d) and Cu (2p). Since the sample was charging, an electron flood gun was used during the XPS experiments. Atomic concentrations of each element were calculated using CasaXPS (Casa Software Ltd.) by determining the relevant integral peak areas, and applying the sensitivity factors supplied by the instrument manufacturer; a Shirley background was used. To compare the high-resolution C (1s) and O (1s) peak positions, the spectra were shifted to ensure that the leading edges of the fitted aliphatic $CH_x$ component were coincident and the detail spectra were fitted with several peaks using a mixed Gaussian-Lorentzian function.

Figure 3:
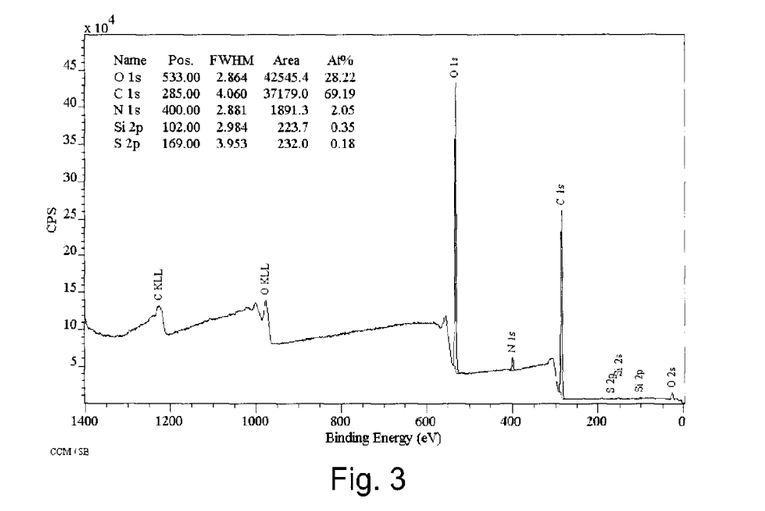
FIG. 3 depicts the XPS spectrum of CNCs from flax prepared by ammonium persulfate treatment in accordance with the present invention; and, FIG. 4 depicts IR absorption bands and their assignments for various cellulosic materials and corresponding CNCs prepared in accordance with the present invention.

The XPS spectrum of CNCs from flax prepared by ammonium persulfate treatment is shown in FIG. 3. The sample shows the main segments for C (1s) and O (1s) due to CNCs and only insignificant traces of N (1s), S (2p) and Si (2p).

Example 7

Infrared Spectroscopy (IR)

Fourier transform infrared (FTIR) spectra were collected from 4000 to 400 $cm^{-1}$ for 64 scans at a resolution of 4 $cm^{-1}$ using a Bruker Tensor 27 FTIR spectrophotometer. Samples were run as KBr pellets. Near infrared (NIR) analysis for cellulose content was measured with an Antaris FT-NIR analyzer equipped with an integrating sphere. An internal gold flag was used as the instrument background, the spectral resolution was set to 8 $cm^{-1}$ and 300 scans were processed mathematically to generate one spectrum. The spectra for each sample were processed with the 2nd derivative transformation to remove the spectral baseline drift due to the color and scattered light from the particles. The PLS (Partial Least Square) algorithm was used to develop the correlation models for the cellulose (%), lignin (%), and hemicelluloses (%) concentration measurements (i.e. calibration curves) (Guhados et al., 2005).

CNCs prepared from various biomass sources were characterized by FTIR spectroscopy. FIG. 4 lists the FTIR absorption bands and their assignments for the various cellulosic materials and their corresponding CNCs. The increase of CRI of various cellulose materials after their treatment with persulfate also correlated well with FTIR data. FTIR spectra of the CNCs showed absorption bands that are typical for cellulosic materials. The presence of signals at 1429 $cm^{-1}$, 1163 $cm^{-1}$, 1111 $cm^{-1}$ and 897 $cm^{-1}$ indicated that the CNCs are primarily in the form of cellulose $I_\beta$, except for persulfate-treated bacterial cellulose in which characteristic absorption bands at 3241 $cm^{-1}$ and 753 $cm^{-1}$ confirms the high degree of cellulose type $I_\alpha$ in bacterial cellulose. Persulfate treatment of bacterial cellulose resulted in the reduction of the mass fraction of cellulose $I_\alpha$ to $I_\beta$. The absorption patterns of the CNCs remained unchanged after treatment with persulfate, indicating that there are no significant changes to the conformation of the cellulose structure, i.e. mercerization did not occur. The ratios between crystalline absorption at 1430 $cm^{-1}$ and amorphous absorption at 895 $cm^{-1}$ of CNCs was higher than that of its parental counterpart (Nelson and O'Connor, 1964). Although this FTIR ratio has been used to calculate CRI, its applicability is somewhat limited, e.g., not applicable for mercerized cellulose (cellulose II) and provides rather poor correlations with the PXRD data. The IR spectra of CNCs prepared from various materials displayed a peak at 1735 $cm^{-1}$, which was absent from CNCs obtained by acid hydrolysis. This peak could be attributed to oxidation of the C6 primary hydroxyl groups on the cellulose fibers to form carboxylic acids. The degree of oxidation (DS) of the CNCs was determined using a conductometric titration method to be about 0.08 (da Silva Perez et al., 2003). Conductometric titration experiments on different samples showed that the degree of oxidation can be in a range of from about 0.08 to 0.19. The increase of CRI of flax and hemp after their treatment with ammonium persulfate also correlated well with an increase in cellulose content as observed by NIR analysis (Kramer and Ebel, 2000; Poke and Raymond, 2006). Cellulose content for flax fibers increased from 70% to 79% after persulfate treatment, whereas the cellulose content for hemp increased from 75% to 83%. CNCs with higher cellulose content may be prepared using fibers treated with pectate lyase, with cellulose content of 84% and 93% for flax and hemp, respectively. The observed increase in cellulose content illustrated that the present process is effective in the removal of non-cellulosic content from the natural fibers.

REFERENCES

The contents of the entirety of each of which are incorporated by this reference.

Aho O, Gadda L, Peltonen S, Immonen K, Liukkonen S, Funck H. (2006) United States Patent Publication 2006/0144543 published Jul. 6, 2006.

Bai W, Holbery J, Li K. (2009) *Cellulose.* 16, 455.

Bhatnagar A, Sain M. (2005) *J. Reinf. Plast. Compos.* 24, 1259.
Brown Jr. R M, Willison J H M, Richardson C L. (1976) *Proc. Natl. Acad. Sci. U.S.A.* 73, 4565.
Cao X, Dong H, Li C M. (2007) *Biomacromolecules.* 8, 899.
Cao X, Chen Y, Chang P R, Stumborg M, Huneault M A. (2008) *J. Appl. Polym. Sci.* 109, 3804.
Calvini P, Gorassini A, Luciano G, Franceschi E. (2006) *Vib. Spectrosc.* 40, 177.
Cheng K C, Catchmark J M, Demirci A. (2009) *J. Biol. Eng.* 3, 12.
da Silva Perez D, Montanari S, Vignon M R. (2003) *Biomacromolecules.* 4, 1417.
Debye P. (1915) *Ann. Physik.* 46, 809.
Dong X M, Revol J-F, Gray D G. (1998) *Cellulose.* 5, 19.
Dong S, Roman M. (2007) *J. Am. Chem. Soc.* 129, 13810.
Edgar C, Gray D G. (2003) *Cellulose.* 10, 299.
Guhados G, Wan W K, Hutter J L. (2005) *Langmuir.* 21, 6642.
Hsieh Y-L, Xie J, Wang Y, Chen H, Li L, Zhang L, Cecile C. (2004) United States Patent Publication 2004/0241436 published Dec. 2, 2004.
Hsu S-C, Don T-M, Chiu W-Y. (2002) *Polym. Degrad. Stab.* 75, 73.
Iguchi M, Yamanaka S, Budhiono A. (2000) *J. Mater. Sci.* 35, 261.
Jayme G, Knolle H. (1964) *Papier.* 19, 106.
Kramer K, Ebel S. (2000) *Anal. Chim. Acta.* 420, 155.
Krassig H A. (1996) *Cellulose: structure, accessibility and reactivity.* (Gordon & Breach Sci. Publishers. Amsterdam, The Netherlands).
Kumar V, Kothari S H. (1999) *Int. J. Pharm.* 177, 173.
Loelovich M. (2008) *Bioresources.* 3, 1403.
Mahmoud K A, Male K B, Hrapovic S, Luong J H T. (2009) *Appl. Mat. Interfaces.* 1, 1383.
Marks R E. (1967) *Cell Wall Mechanics of Tracheids.* (Yale University Press: New Haven, London).
Nelson M L, O'Connor R T. (1964) *J. Appl. Polym. Sci.* 8, 311.
Nishiyama Y, Langan P, Chanzy H. (2002) *J. Am. Chem. Soc.* 124, 9074.
Ohad I, Danon I O, Hestrin S. (1962) *J. Cell. Biol.* 12, 31.
Oksman K, Bondeson D, Syre P. (2008) United States Patent Publication 2008/0108772, published May 8, 2008.
Poke F S, Raymond C A. (2006) *J. Wood Chem. Technol.* 26, 187.
Revol J-F, Bradford H, Giasson J. Marchessault R H, Gray DG. (1992) *Int. J. Biol. Macromol.* 14, 170.
Scherrer P. (1918) *Gottinger Nachr.* 2, 98.
Segal L, Creely J J, Martin A E, Conrad C M. (1959) *Textile Res. J.* 29, 786.
Springer E L, Minor J L. (1991) U.S. Pat. No. 5,004,523 issued Apr. 2, 1991.
Stiernstedt J, Nordgren N, Wagberg L, Brumer H, Gray D G, Rutland M W. (2006) *J. Colloid Interface Sci.* 303, 117.
Šturcová A, Davies G R, Eichhorn S J. (2005) *Biomacromolecules.* 6, 1055.
Thygesen A, Oddershede J, Lilholt H, Thomsen A B, Stahl K. (2005) *Cellulose.* 12, 563.
Wang B, Sain M, Oksman K. (2007) *Appl. Compos. Mater.* 13, 89.
Weast R C. (1983) *Handbook of Chemistry and Physics,* 64$^{th}$ ed. (CRC Press, Boca Raton, Fla.).
Zhu W, Wang Z, Tan O K, Zkao C. (2005) United States Patent Publication 2005/0255239 published Nov. 17, 2005.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A process for producing cellulose nano crystals, said process comprising:
    (i) contacting a cellulosic material with an inorganic persulfate at a temperature of from 45° C. to 70° C.
    (ii) stirring the inorganic persulfate and cellulosic material for a period of time in a range of from 5 hours to 24 hours to produce cellulose nanocrystals.

2. The process according to claim 1, wherein the inorganic persulfate comprises ammonium persulfate, sodium persulfate, potassium persulfate or a mixture thereof.

3. The process according to claim 1, wherein the inorganic persulfate comprises ammonium persulfate.

4. The process according to claim 1, wherein the cellulosic material comprises vegetative biomass.

5. The process according to claim 1, wherein the cellulosic material comprises one or more of hemp or flax material.

* * * * *